United States Patent
Inagawa et al.

(10) Patent No.: US 9,527,459 B2
(45) Date of Patent: Dec. 27, 2016

(54) FRONT PILLAR GARNISH

(71) Applicant: TOYOTA BOSHOKU KABUSHIKI KAISHA, Aichi-ken (JP)

(72) Inventors: Keisuke Inagawa, Toyota (JP); Masayuki Kito, Miyoshi (JP); Tadashi Nagae, Anjo (JP); Yoshifumi Tatsuta, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/829,931

(22) Filed: Aug. 19, 2015

(65) Prior Publication Data

US 2016/0068115 A1    Mar. 10, 2016

(30) Foreign Application Priority Data

Sep. 4, 2014   (JP) .................. 2014-180133

(51) Int. Cl.
*B60R 13/00* (2006.01)
*B60R 13/02* (2006.01)

(52) U.S. Cl.
CPC ...... *B60R 13/025* (2013.01); *B60R 2013/0281* (2013.01); *B60R 2013/0287* (2013.01); *B60R 2013/0293* (2013.01)

(58) Field of Classification Search
CPC .............................. B60R 13/025; B62D 25/04
USPC ........................................ 296/193.06, 187.05
See application file for complete search history.

(56) References Cited

U.S. PATENT DOCUMENTS

| | | | |
|---|---|---|---|
| 5,564,744 A * | 10/1996 | Frost ...................... | B60R 13/025 280/751 |
| 8,474,904 B2 * | 7/2013 | Suga ................... | B60R 13/0212 296/193.06 |

FOREIGN PATENT DOCUMENTS

| JP | 2002-137706 | 5/2002 |
|---|---|---|
| JP | 2009-113714 | 5/2009 |

* cited by examiner

*Primary Examiner* — Joseph D Pape
(74) *Attorney, Agent, or Firm* — Greenblum & Bernstein, P.L.C.

(57) ABSTRACT

A front pillar garnish to be mounted to a front pillar in an interior of a vehicle includes a garnish body. The garnish body includes a first garnish component and a second garnish component. The first garnish component includes a first design surface. The second garnish component includes a second design surface. At least one of the first garnish component and the second garnish component includes a garnish component body and a shock absorbing portion that extends from the garnish component body over a back surface of the other one of the first garnish component and the second garnish component. The shock absorbing portion is integrally formed with the garnish component body.

7 Claims, 5 Drawing Sheets

FRONT PILLAR GARNISH

CROSS REFERENCE TO RELATED APPLICATION

This application claims priority from Japanese Patent Application No. 2014-180133 filed on Sep. 4, 2014. The entire contents of the priority application are incorporated herein by reference.

TECHNICAL FIELD

The present disclosure relates to a front pillar garnish.

BACKGROUND

A front pillar garnish (or a front pillar trim) may include a garnish body (or a trim body) including ribs on the back surface thereof for reinforcing the garnish body. According to the configuration, even if the front pillar garnish hits an occupant in the head, the front pillar garnish does not easily crush. Therefore, the occupant's head is less likely to hit a pillar. Furthermore, the front pillar garnish effectively absorbs impact of a collision.

A shock absorber or a shock dispersing member may be provided separately from the garnish body. If the shock absorber or the shock dispersing member is separately provided, a material and a shape of the shock absorber or the shock dispersing member are defined regardless of those of the garnish body and thus high shock absorbing performance is achieved. However, the number of components increases.

The front pillar garnish may include two different design surfaces. A proper level of the shock absorbing performance is required even if the front pillar garnish includes two different design surfaces.

An object is to provide a front pillar garnish including at least two design surfaces and having a proper level of shock absorbing performance without an increase in the number of parts.

SUMMARY

A front pillar garnish to be mounted to a front pillar in an interior of a vehicle includes a garnish body. The garnish body includes a first garnish component and a second garnish component. The first garnish component includes a first design surface. The second garnish component includes a second design surface. At least one of the first garnish component and the second garnish component includes a garnish component body and a shock absorbing portion that extends from the garnish component body over a back surface of the other one of the first garnish component and the second garnish component. The shock absorbing portion is integrally formed with the garnish component body.

DETAILED DESCRIPTION

An embodiment will be described with reference to FIGS. 1 to 5. A front pillar garnish 30 mounted to a vehicle interior side of a front pillar 20 in an interior of a vehicle will be described.

Figure 1:
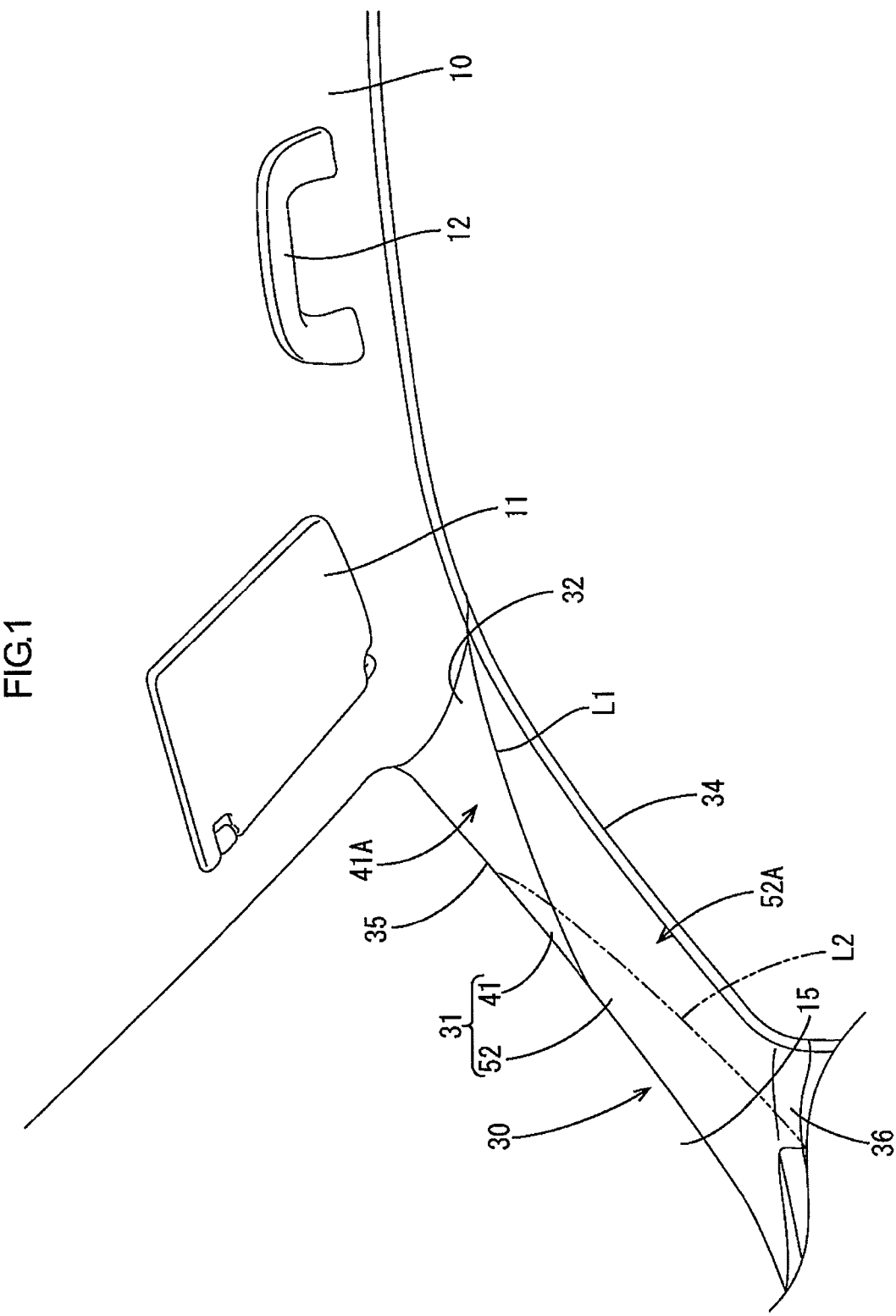
FIG. 1 is a perspective view of a front pillar garnish according to an embodiment.

FIG. 1 is a perspective view illustrating an interior of the vehicle viewed toward the right front from a driver's seat. A roof lining 10, which is an interior ceiling component, is mounted to a ceiling of the vehicle. A sun visor 11 and an assist grip 12 are mounted to the roof lining 10.

Figure 5:
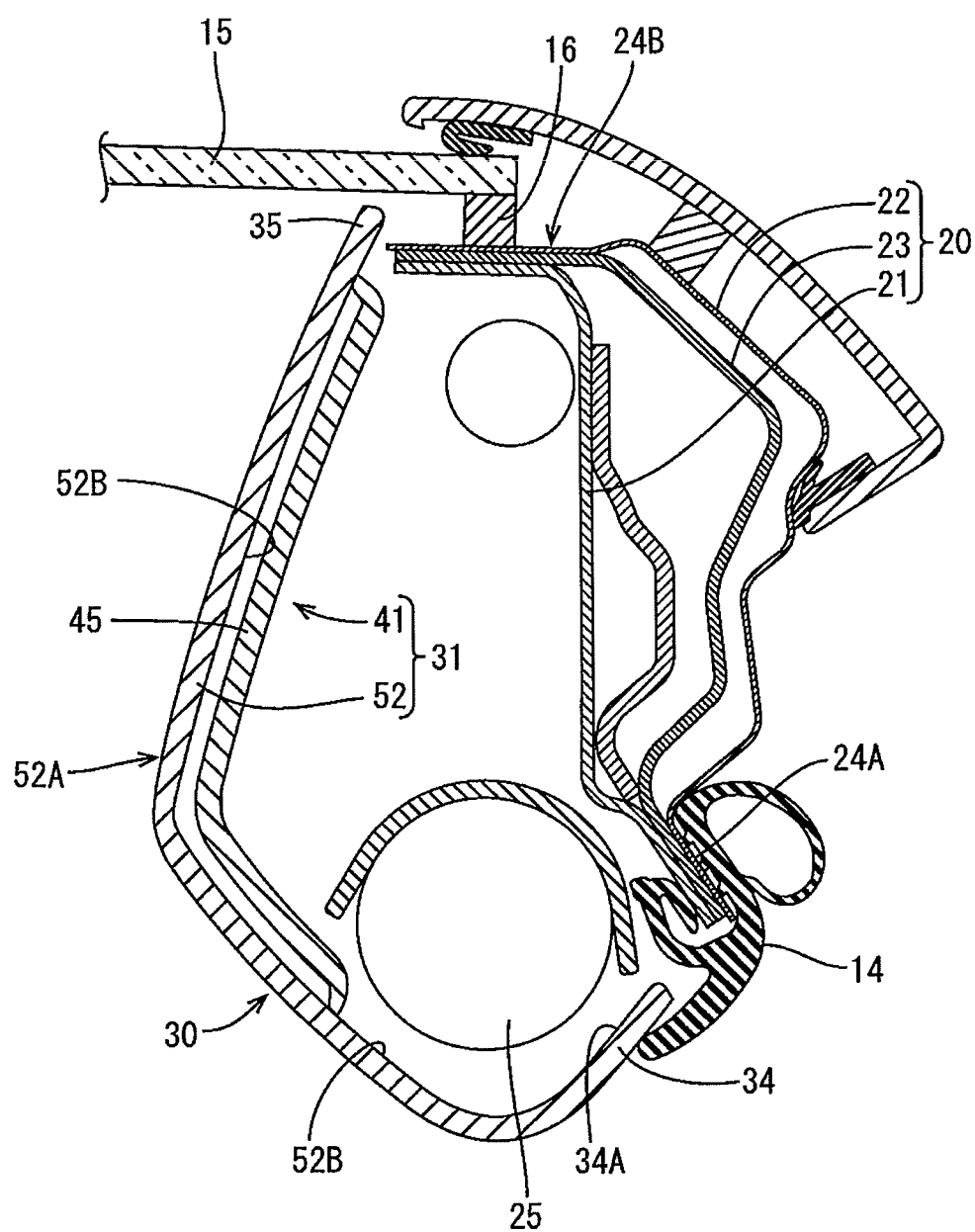
FIG. 5 is a cross-sectional view of the pillar garnish along line V-V in FIG. 2.

As illustrated in FIG. 5, the front pillar 20 includes an inner panel 21, an outer panel 22, and a reinforcement panel 23. The inner panel 21 and the outer panel 22 are disposed on the interior side and on the exterior side, respectively. The reinforcement panel 23 is disposed between the inner panel 21 and the outer panel 22.

Edge portions of the panels 21, 22 and 23 are overlaid on one another and connected with one another. A portion of the front pillar 20 including the edge portions of the panels 21, 22 and 23 closer to the rear of the vehicle is referred to as a rear overlaid portion 24A. A portion of the front pillar 20 including the edge portions of the panels 21, 22 and 23 closer to the front of the vehicle is referred to as a front overlaid portion 24B. A weather strip 14 is mounted to the rear overlaid portion 24A. A sealing member 16 that is an elastic member is disposed between the front overlaid portion 24B and a side edge of a front windshield 15.

The front pillar garnish 30 is mounted to the front pillar 20 so as to cover the front pillar 20 from the interior side of the vehicle. As illustrated in FIG. 1, the front pillar garnish 30 includes a garnish body 31. The garnish body 31 has an elongated shape that extends along a direction in which the front pillar 20 extends and covers the front pillar 20 from the vehicle interior side.

Figure 3:
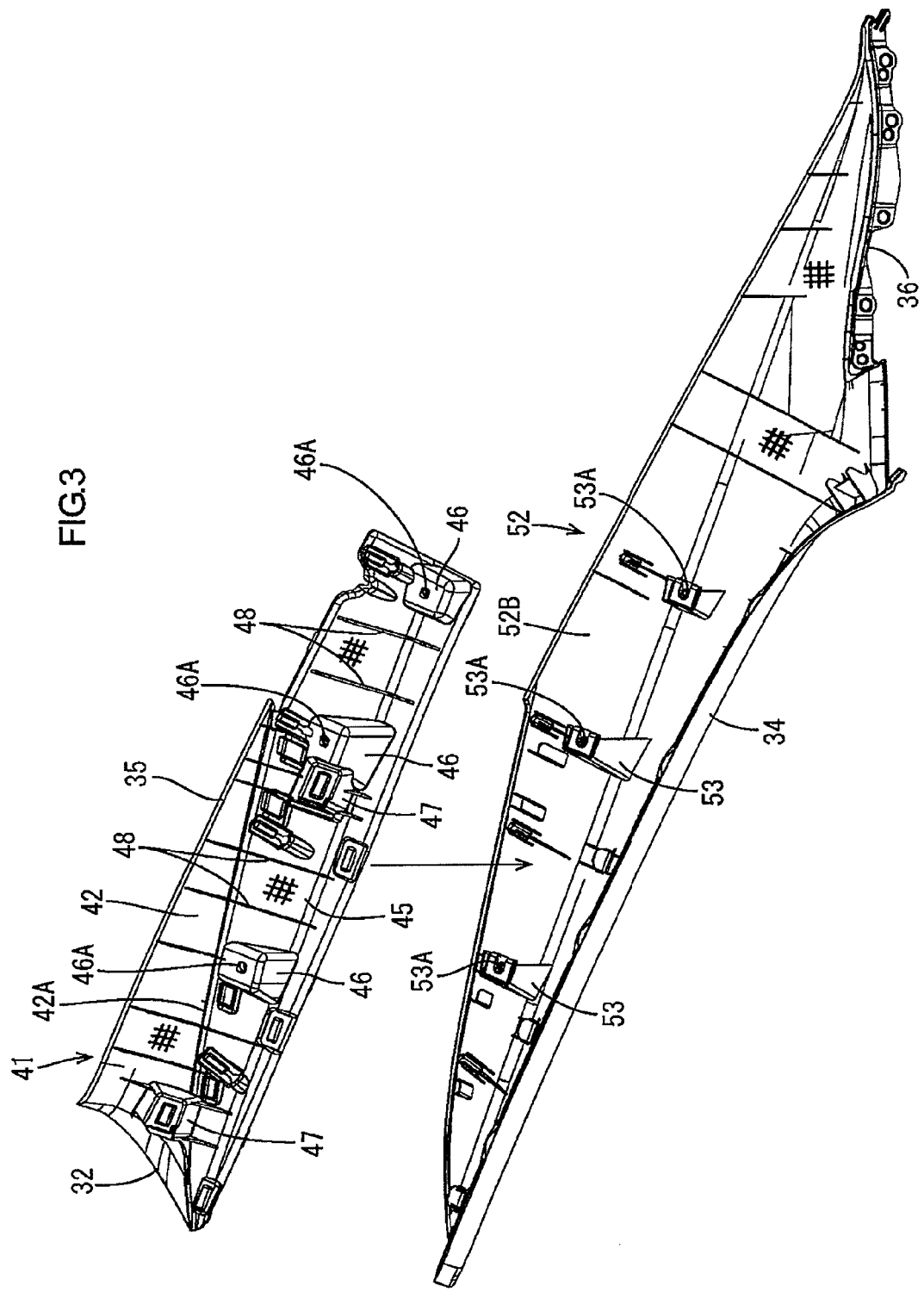
FIG. 3 is an exploded perspective view of the front pillar garnish.

As illustrated in FIG. 5, an airbag 25 (a curtain shield airbag) is retracted in space between the front pillar 20 and the garnish body 31. As illustrated in FIG. 3, the garnish body includes a first garnish component 41 and a second garnish component 52.

As illustrated in FIG. 1, the garnish body 31 includes a top edge 32 closer to the top of the vehicle, a side edge 35 closer to the front of the vehicle, a sidewall 34 closer to the rear of the vehicle, and a bottom edge 36 closer to the bottom of the vehicle. A top edge and the a side edge of the first garnish component 41 form a large portion of the top edge 32 and an upper portion of the side edge 35 of the garnish body 31, respectively. A front side edge, and a rear side edge, and a bottom edge of the second garnish component 52 form a lower portion of the side edge 35, the sidewall 34, and the bottom edge 36 of the garnish body 31, respectively. The side edge 35 and the sidewall 34 are opposite to each other in a short dimension of the garnish body 31.

Figure 4:
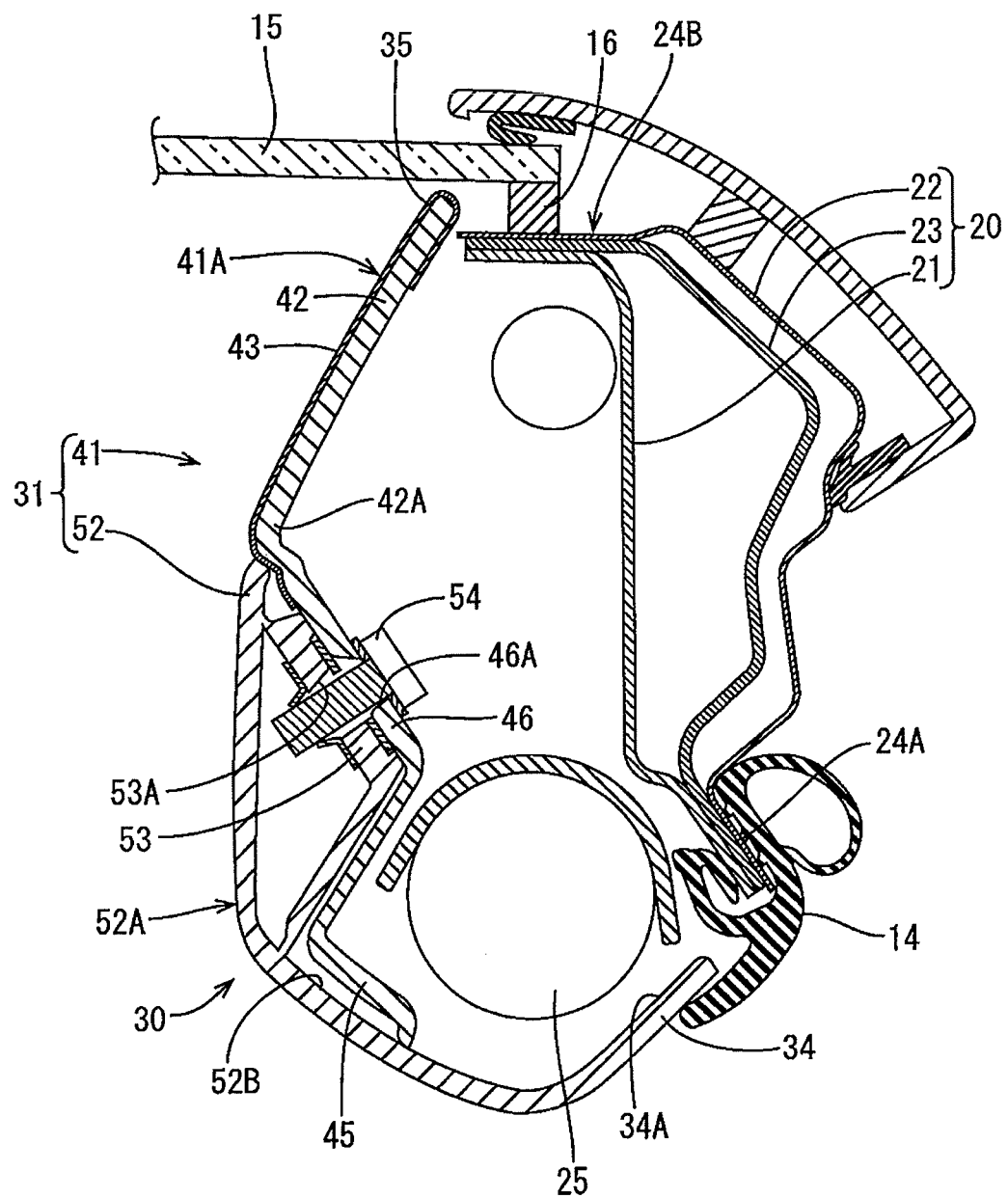
FIG. 4 is a cross-sectional view of the pillar garnish along line IV-IV in FIG. 2.

As illustrated in FIG. 4, the first garnish component 41 includes a base portion 42 (a garnish component body), a skin member 43, and an extending portion 45. The base portion 42 is made of synthetic resin. The skin member 43 covers a surface of the base portion 42. The extending portion 45 extends from the base portion 42. The first garnish component 41 includes a design surface 41A that is formed by covering the surface of the base portion 42 with the skin member 43. The second garnish component 52 is not covered with a skin member. The second garnish component 52 includes a base portion made of synthetic resin and a surface of the base portion is configured as a design surface 52A.

A color of the skin member 43 and a color of the second garnish component 52 are different from each other. Namely, the design of the design surface 41A (a first design surface) of the first garnish component 41 and the design of the design surface 52A (a second design surface) of the second garnish component 52 are different from each other. The skin member 43 may be provided in white and the second garnish component 52 may be provided in black. The colors of the skin member 43 and the first garnish component 52 are not limited to white and black, respectively.

As illustrated in FIG. 1, the lower edge of the design surface 41A and the upper edge of the design surface 52A are adjacent to each other. A boundary L1 between the first design surface 41A and the second design surface 52A extends from the side edge 35 to the top edge 32.

The boundary L1 is angled toward the rear as a distance from the bottom thereof toward the top increases. The boundary L1 ends at the right edge of the roof lining 10.

As illustrated in FIG. 3, the extending portion 45 (a shock absorbing portion) extends from an edge 42A of the base portion 42 closer to the second garnish component 52 to the back surface 52B of the second garnish component 52. The extending portion 45 and the base portion 42 are provided in a single piece. The edge 42A of the base portion 42 closer to the second garnish component 52 corresponds with the boundary L1 described earlier. Namely, the extending portion 45 extends along the boundary L1.

Figure 2:
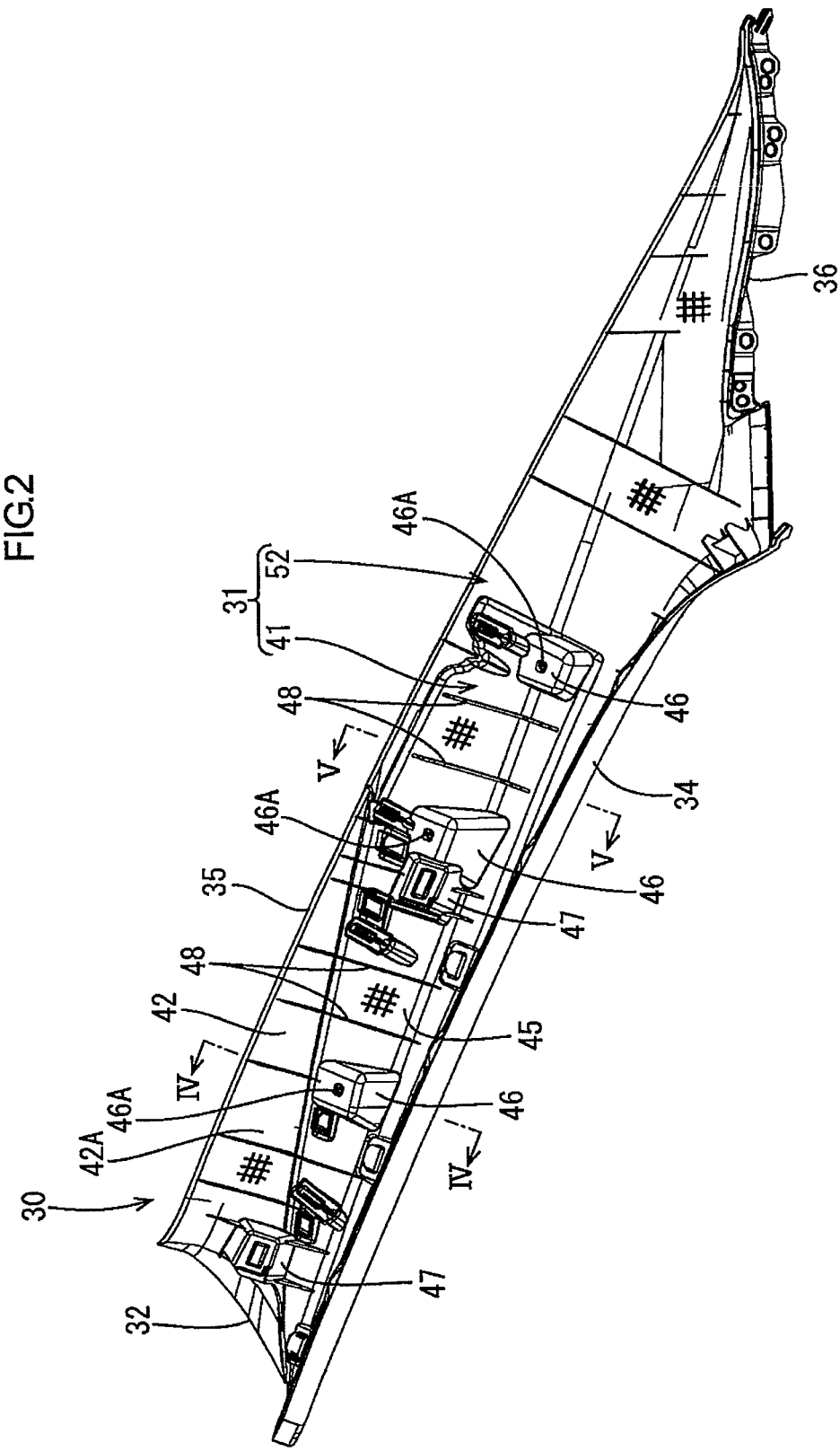
FIG. 2 is a perspective view of the rear of the front pillar garnish.

As illustrated in FIG. 2, the extending portion 45 is disposed over the back surface (a surface on the vehicle exterior side) of the second garnish component 52. Namely, the base portion 42 of the first garnish component 41 is exposed in the interior of the vehicle.

Mounting protrusions 53 protrude from the back surface of the second garnish component 52 toward the first garnish component 41. Each of the mounting protrusions 53 has a box-like shape with an opening. A distal end surface of each mounting protrusion 53 has an insertion hole 53A that is a through hole.

Fixing protrusions 46 protrude from portions of the extending portion 45 corresponding to the mounting protrusions 53. The fixing protrusions 46 are formed by protruding portions of the extending portion 45 on the back surface side. The fixing protrusions 46 have insertion holes 46A that are through holes at portions corresponding to the insertion holes 53A. The extending portion 45 extends from the first garnish component 41 toward the sidewall 34. The back surface of the sidewall 34 is not covered with the extending portion 45.

As illustrated in FIG. 4, the mounting protrusions 53 are inserted into the fixing protrusions 46 from the vehicle interior side and fitted, respectively. Bolts 54 are inserted in the insertion holes 46A and the insertion holes 53A. As a result, the extending portion 45 (i.e., the first garnish component 41) is fixed to the second garnish component 52. Fixing members for fixing the extending portion 45 to the second garnish component 52 are not limited to the bolts. They may be fixed with thermal caulking.

Clip mounts 47 (two of them in this embodiment) protrude from the back surface of the base portion 42. Clips (not illustrated) mounted to the clip mounts 47 are mounted to the inner panel 21 of the front pillar 20.

The first garnish component 41 is a board having a rectangular overall shape. Ribs 48 protrude from the back surface of the base portion 42 and extend along the short dimension of the base portion 42. The ribs 48 are arranged along the long dimension of the first garnish component 41.

The ribs 48, the fixing protrusions 46, and the clip mounts 47 are formed on the back surface of the extending portion 45. According to the configuration, the rigidity of the extending portion 45 is higher than the rigidity of the second garnish component 52.

The first garnish component 41 has rigidity higher than the second garnish component 52 (other garnish component). The second garnish component 52 is made of thermoplastic elastomer olefin (TPO). The first garnish component 41 and the extending portion 45 are made of Toyota super olefin polymer (TSOP, a registered trademark).

The materials of the base portion 42, the extending portion 45, and the second garnish component 52 are not limited to those described above. The base portion 42 and the extending portion 45 may be made of any materials having rigidity higher than the material of the second garnish component 52.

The base portion 42 and the extending portion 45 may be made of a material that is a combination of the material of the second garnish component 52 (polyolefin resin in this embodiment) and fillers such as glass fibers. With such a material, the base portion 42 and the extending portion 45 have rigidity higher than the second garnish component 52.

The extending portion 45 having the higher rigidity and thus the extending portion 45 functions as a shock absorber for absorbing impact on an occupant of the vehicle when the front pillar garnish 30 hits the occupant in a vehicle collision.

The extending portion 45 is disposed between the second garnish component 52 and the front pillar 20. When the front pillar garnish 30 hits the occupant, the extending portion 45 deforms and impact of the collision is absorbed.

The second garnish component 52 is reinforced by the extending portion 45. Even if the second garnish component 52 hits the occupant, the second garnish component 52 does not easily deform. Therefore, the occupant is less likely to receive direct impact from the front pillar 20.

Next, a positional relationship between the airbag 25 and the front pillar garnish 30 will be described. As illustrated in FIGS. 4 and 5, the airbag 25 is retracted at an end of space defined by the front pillar 20 and the garnish body 31 closer to the sidewall 34.

The airbag 25 is disposed opposite the back surface 34A of the sidewall 34. The airbag 25 is inflated and deployed toward the rear of the vehicle (the lower side in FIG. 4). When inflated, the airbag 25 presses the back surface of the sidewall 34 and deforms the sidewall 34 while coming out to the interior.

As described earlier, the sidewall 34 is a portion of the second garnish component 52. The extending portion 45 of the first garnish component 41 extends so as not to overlap the sidewall 34 on the back surface side of the second garnish component 52 (see FIGS. 4 and 5). Namely, the extending portion 45 is not disposed opposite the back surface 34A of the sidewall 34 so that the extending portion 45 does not become an obstacle to the deployment of the airbag 25.

The extending portion 45 is not disposed between the airbag 25 and the second garnish component 52 in a direction in which the airbag 25 is deployed. The airbag 25 directly face the back surface 34A of the sidewall 34.

Next, effects will be described. In this embodiment, the first garnish component 41 including the design surface 41A and the second garnish component 52 including the design surface 52A are different components. Namely, the design surface 41A and the design surface 52A can be independently designed. Furthermore, the extending portion 45 extends from the base portion 42 of the first garnish component 41. The extending portion 45 is a shock absorbing portion. The extending portion 45 and the base portion 42 are formed in a single component. Therefore, the front pillar garnish 30 including two different design surfaces has a proper level of the shock absorbing performance without increasing the number of components.

The extending portion 45 has the rigidity higher than the second garnish component 52. With the extending portion 45 having the higher rigidity, the impact of the collision is effectively absorbed.

The garnish body 31 includes the sidewall 34 and the side edge 35 opposite to each other, the top edge 32, and the bottom edge 36. The airbag 25 is disposed closer to the sidewall in the space defined by the front pillar 20 and the garnish body 31. The boundary L1 between the design surface 41A and the design surface 52A extends between at least two of the side edge 35, the top edge 32, and the bottom edge 36. The extending portion 45 extends along the boundary L1.

The extending portion 45 extends along the boundary L1 and the boundary L1 does not cross the sidewall 34. Namely, the extending portion 45 does not overlap the sidewall 34. During the deployment of the airbag 25 from the sidewall 34, the extending portion 45 does not become an obstacle to the deployment of the airbag 25. Therefore, the deployment of the airbag 25 is properly performed.

The sidewall 34 is a portion of the second garnish component 52. The airbag 25 is disposed opposite the back surface 34A of the sidewall 34 and the extending portion 45 is not disposed opposite the back surface 34A of the sidewall 34.

Namely, the airbag 25 is disposed opposite the back surface 34A of the sidewall 34 where the extending portion 45 is not disposed. Therefore, the extending portion 45 does not become an obstacle to the deployment of the airbag 25.

An end of the boundary L1 is located at the side edge 35 and the other end of the boundary L1 is located at the top edge 32. The extending portion 45 extends from the first garnish component 41 to the sidewall 34.

According to the configuration, the extending portion 45 having a larger area can be provided so as not to overlap the back surface 34A of the sidewall 34.

The airbag 25 is disposed opposite the sidewall 34 of the garnish body 31 located closer to the rear of the vehicle. Therefore, the airbag 25 is properly deployed toward the rear of the vehicle.

The garnish body 31 includes two components (the first garnish component 41 and the second garnish component 52). Therefore, two design surfaces 41A and 52A are easily designed.

Furthermore, the first garnish component 41 (specifically the extending portion 45) has the rigidity higher than the second garnish component 52. According to the configuration, the extending portion 45 effectively functions as a shock absorber. Namely, the extending portion 45 is configured as a portion of the first garnish component 41 and thus the high shock absorbing performance is achieved.

The portion of the garnish body 31 opposite the airbag 25 (i.e., the sidewall 34) is a portion of the second garnish component 52 having the lower rigidity. The portion is easily deformed during the deployment of the airbag 25 and thus the airbag 25 is properly deployed.

OTHER EMBODIMENTS

The technology described herein is not limited to the above embodiments described in the above description and the drawings. The following embodiments may be included in the technical scope of the present invention.

(1) The design surfaces may be configured differently from the above embodiment. For example, design surfaces may be configured with a boundary L2 in FIG. 1 which extends from the side edge 35 to the bottom edge 36. Furthermore, design surfaces may be configured with a boundary that extends from the top edge 32 to the bottom edge 36.

(2) The first garnish component 41 may not include the skin member 43. Namely, a surface of the base portion 42 may be configured as a design surface of the first garnish component.

What is claimed is:

1. A front pillar garnish configured to be mounted to a front pillar in an interior of a vehicle, the front pillar garnish comprising a garnish body including:
    a first garnish component including a garnish component body and a shock absorbing portion, a front surface of the garnish component body having a first design surface; and
    a second garnish component, a front surface of the second garnish component having a second design surface, wherein
    the shock absorbing portion extends from an edge of the garnish component body and over a back surface of the second garnish component, and the shock absorbing portion has a rigidity higher than a rigidity of the second garnish component,
    the shock absorbing portion is provided integrally with the garnish component body as a single piece,
    the edge of the garnish component body of the first garnish component and a terminal edge of the second garnish component define a boundary between the first design surface and the second design surface, and
    the boundary includes a recess that receives the terminal edge of the second garnish component such that the first design surface and the second design surface, together, define an outer surface of the front pillar garnish that faces the interior of the vehicle when the front pillar garnish is mounted to the front pillar.

2. The front pillar garnish according to claim 1, wherein
    the garnish body includes a top edge, a bottom edge, a side edge, and a sidewall,
    the garnish body defines a space with the front pillar for holding an airbag at a position adjacent to the sidewall in the space,
    the first design surface and the second design surface are configured such that the boundary between the first design surface and the second design surface extends between any two of the side edge, the top edge, and the bottom edge, and
    the shock absorbing portion extends along the boundary.

3. The front pillar garnish according to claim 2, wherein
    the sidewall is a portion of the second garnish component,
    the second garnish component is disposed such that a back surface of the sidewall is opposite the airbag, and
    the shock absorbing portion is not disposed opposite the back surface of the sidewall.

4. A front pillar garnish configured to be mounted to a front pillar in an interior of a vehicle, the front pillar garnish comprising a garnish body including:
    a top edge;
    a bottom edge;
    a side edge;
    a sidewall;

a first garnish component having a first design surface; and a second garnish component having a second design surface, wherein at least one of the first garnish component and the second garnish component includes a garnish component body and a shock absorbing portion that extends from the garnish component body over a back surface of the other one of the first garnish component and the second garnish component and integrally provided with the garnish component body, the garnish body defines a space with the front pillar for holding an airbag at a position adjacent to the sidewall in the space, the first design surface and the second design surface are configured such that a boundary between the first design surface and the second design surface extends between any two of the side edge, the top edge, and the bottom edge, the shock absorbing portion extends along the boundary, the sidewall is a portion of the other one of the first garnish component and the second garnish component, the other one of the first garnish component and the second garnish component is disposed such that a back surface of the sidewall is opposite the airbag, the shock absorbing portion is not disposed opposite the back surface of the sidewall, the first design surface and the second design surface are configured such that a first end of the boundary between the first design surface and the second design surface is located at the side edge and a second end of the boundary is located at any one of the top edge and the bottom edge, and the shock absorbing portion extends from the one of the first garnish component and the second garnish component to the sidewall.

5. The front pillar garnish according to claim 2, wherein the sidewall is located at a rear edge of the garnish body, the rear edge of the garnish body being located closer to a rear of the vehicle than to a front of the vehicle when the front pillar garnish is mounted to the front pillar.

6. The front pillar garnish according to claim 1, wherein the shock absorbing portion includes an opposed wall and a sidewall, the opposed wall is opposed to the back surface of the second garnish component and arranged such that a space is provided between the back surface of the second garnish component and the opposed wall, the sidewall projects from an edge of the opposed wall toward the back surface of the second garnish component and a distal end surface of the sidewall contacts the back surface of the second garnish component, and the space between the back surface of the second garnish component and the opposed wall is defined at least by the opposed wall, the sidewall, and the back surface of the second garnish component.

7. The front pillar garnish according to claim 1, wherein the second garnish component includes a mounting protrusion having a box shape, the mounting protrusion protrudes from the back surface of the second garnish component toward the first garnish component, the mounting protrusion has a distal end surface that has an insertion hole, the first garnish component includes a fixing protrusion having a box shape, the fixing protrusion protrudes from a portion of the shock absorbing portion corresponding to the mounting protrusion, the fixing protrusion has a distal end surface that has a through hole at a position corresponding to the insertion hole, the mounting protrusion is inserted in the fixing protrusion, and the first garnish component is fixed to the second garnish component with a fixing member inserted in the insertion hole and the through hole.

\* \* \* \* \*